United States Patent
Boomer et al.

(10) Patent No.: US 11,241,703 B2
(45) Date of Patent: Feb. 8, 2022

(54) CLEAR SPRAYABLE SEALANT FOR AIRCRAFT PARTS AND ASSEMBLIES

(71) Applicant: THE PATENT WELL LLC, Fort Worth, TX (US)

(72) Inventors: Kent Boomer, Aledo, TX (US); Chad Knight, Dodd City, TX (US); Michael Dry, Fort Worth, TX (US); Peter Sibello, Fort Worth, TX (US); Jeff Busby, Millsap, TX (US)

(73) Assignee: THE PATENT WELL, LLC, Fort Worth, TX (US)

( * ) Notice: Subject to any disclaimer, the term of this patent is extended or adjusted under 35 U.S.C. 154(b) by 0 days.

(21) Appl. No.: 16/717,784

(22) Filed: Dec. 17, 2019

(65) Prior Publication Data

US 2020/0122170 A1    Apr. 23, 2020

Related U.S. Application Data

(62) Division of application No. 15/472,859, filed on Mar. 29, 2017, now Pat. No. 10,507,478.

(60) Provisional application No. 62/315,361, filed on Mar. 30, 2016, provisional application No. 62/409,652, filed on Oct. 18, 2016.

(51) Int. Cl.
| | |
|---|---|
| *B05D 1/02* | (2006.01) |
| *B05D 1/36* | (2006.01) |
| *B05C 1/02* | (2006.01) |
| *B05B 7/04* | (2006.01) |
| *C09D 175/02* | (2006.01) |
| *C09D 175/04* | (2006.01) |
| *B64F 5/00* | (2017.01) |
| *B05B 7/24* | (2006.01) |
| *B05D 1/38* | (2006.01) |
| *B05D 3/04* | (2006.01) |
| *B64C 1/00* | (2006.01) |
| *B05C 17/015* | (2006.01) |
| *F16B 5/02* | (2006.01) |

(52) U.S. Cl.
CPC .......... *B05B 7/0408* (2013.01); *B05B 7/2472* (2013.01); *B05C 1/02* (2013.01); *B05D 1/02* (2013.01); *B05D 1/38* (2013.01); *B05D 3/04* (2013.01); *B64C 1/00* (2013.01); *B64F 5/00* (2013.01); *B05C 17/015* (2013.01); *B64C 2001/0081* (2013.01); *F16B 5/02* (2013.01)

(58) Field of Classification Search
None
See application file for complete search history.

(56) References Cited

U.S. PATENT DOCUMENTS

| | | | |
|---|---|---|---|
| 8,668,399 B2 * | 3/2014 | Parks | B05C 17/0052 401/47 |
| 2012/0183692 A1 * | 7/2012 | Becker, IV | C08G 18/3206 427/289 |

* cited by examiner

*Primary Examiner* — Vu A Nguyen

(57) ABSTRACT

Applicant discloses a two part polymer mix for use in the aircraft industry that is applied with pneumatic mix and spray gun. The two part cartridge is used in the mix and spray gun so the mix is applied immediately upon mixing, but the two components are kept separated unless the gun is applying the mix. The mix cures to form a clear sealant that allows for inspection of cracks and corrosion beneath the sealant. It cures quickly so that the coated part may be further processed, for example in the assembly line during aircraft build.

8 Claims, 11 Drawing Sheets

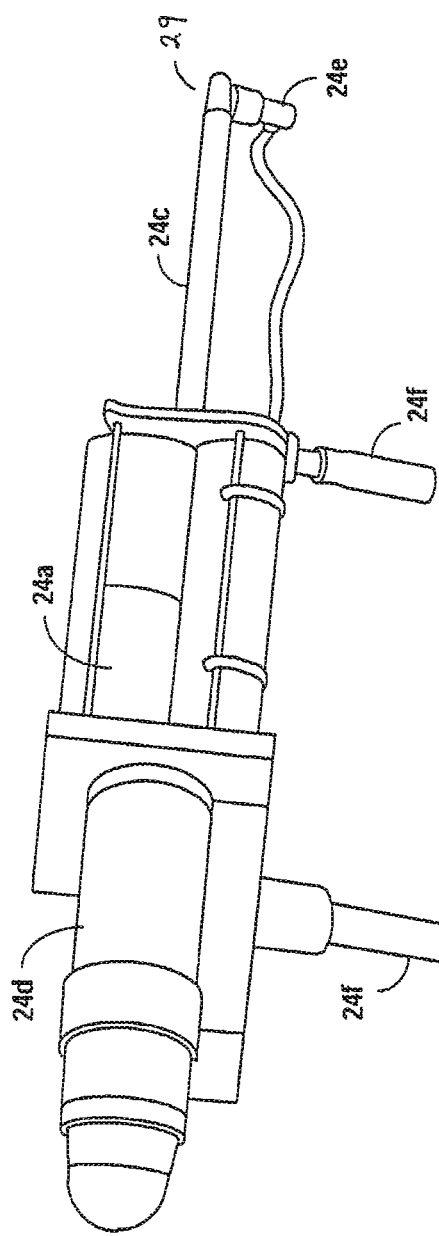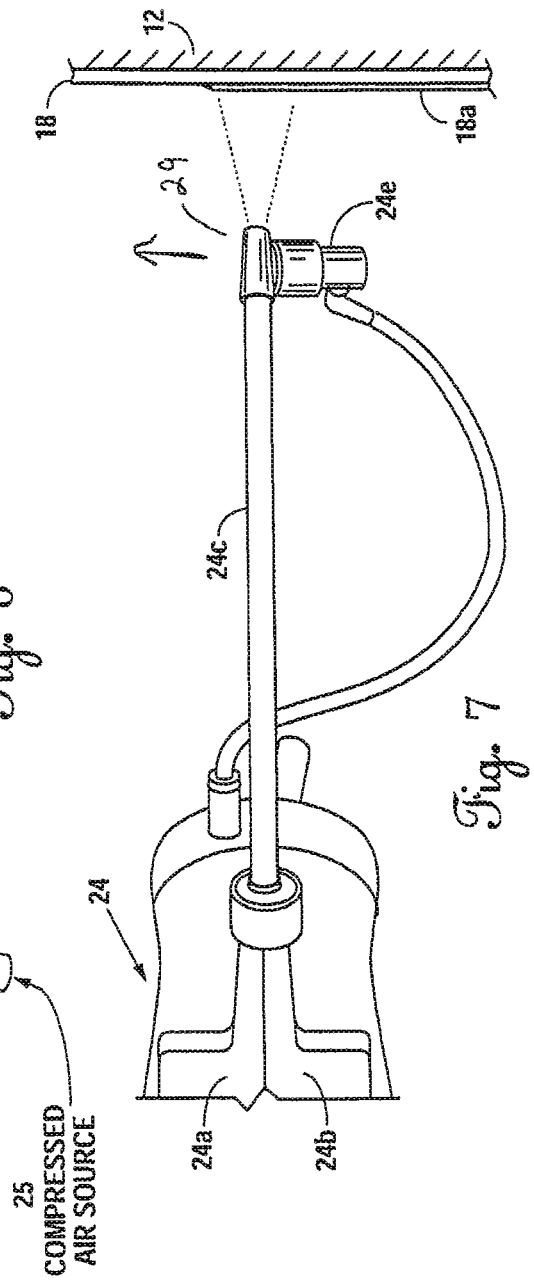

CLEAR SPRAYABLE SEALANT FOR AIRCRAFT PARTS AND ASSEMBLIES

This divisional application claims the benefit of, priority to, and incorporates herein by reference U.S. application Ser. No. 15/472,859, filed Mar. 29, 2017; U.S. Application 62/315,361, filed Mar. 30, 2016; and U.S. Application No. 62/409,652, filed Oct. 18, 2016.

FIELD OF THE INVENTION

Sealant coatings for aircraft parts, more specifically, a clear, thin, elastomeric, watertight two-component pneumatically mixed and applied polymer coating system that will dry and cure relatively quickly when applied to an aircraft part.

BACKGROUND OF THE INVENTION

Aircraft operate in a harsh environment as they are subject to thermal and pressure cycling as well as a changing variety of moisture conditions. Sealants may be provided to prevent corrosion and protect aircraft parts. However, because of the unique environment an aircraft operates in, especially one that files at high altitudes, finding suitable environmental sealants, for example, to prevent moisture from harming an aircraft surface, is often difficult. A proper sealant must have a combination of properties effective for a number of purposes, but must also be easily and quickly prepared and applied so that there is a minimum of downtime.

At present, most prior art sealants suffer from a variety of shortcomings. It is an object of Applicant's present inventions to provide a useful, quick acting sealant suitable for aircraft parts, especially aircraft interior parts, that will be effective in the harsh environment to which the parts are subject yet will be easy to apply and allow for easy inspection (for cracks and the like) of the coated parts.

SUMMARY OF THE INVENTION

In one embodiment, Applicant provides a two-component polyurethane, polyurea or polyurea/polyurethane hybrid mix that may be sprayed on and provides, when cured, a watertight, flexible sealant that is clear to allow for inspection of the coated material (the part, workpiece or substrate) without removal of the sealant coat. The two-component system demonstrates excellent adhesion to itself (cohesion), sufficient adhesion to the base, and allows for easy removal when necessary.

A polyurea elastomer mix or coating may be one derived from the reaction product of an isocyanate component and a resin blend component. The isocyanate can be aromatic or aliphatic in nature. It can be monomer, polymer or any variant reaction of isocyanates, quasi-prepolymer or a prepolymer. The prepolymer or hybrid system quasi-prepolymer can be made of an amine-terminated polymer resin, or a hydroxyl-terminated polymer resin.

The resin blend may be made up of amine-terminated polymer resins and/or amine-terminated chain extenders. The amine-terminated polymer resins will not have any intentional hydroxyl moieties. Any hydroxyls are typically the result of incomplete conversion to the amine-terminated polymer resins. The resin blend may also contain additives or non-primary components. These additives may contain hydroxyls, such as pre-dispersed pigments in a polyol carrier. Normally, the resin blend will not contain a catalyst(s). There are no polyols, or hydroxyl terminated materials, used as the main reactive resin in the resin blend portion of a two-component polyurea elastomer system. If so, then these would be classified as a polyurea/polyurethane hybrid system.

Polyurea/polyurethane hybrid mixes can be defined as the result of a chemical reaction between an isocyanate and a mixture of polyol and amine reactants. These formulations generally provide an "intermediate" polyurea that displays many of the same properties of a polyurea in addition to some of the properties of a polyurethane. In coating formulations, hybrids generally contain a polyether/polyester polyol and a primary amine resulting in a chemical backbone comprised of amine and hydroxyl functionality.

The sealant coating may be mixed and applied in a number of ways: with a brush, straw mixed before application, and meter mixed before application. They are, in a preferred embodiment, processed by specialized plural component equipment, which may develop high pressure for spray application. The two components are mixed inside the impingement mix straw of the cartridge of the mix and spray gun, as there typically is not any pre-mixing or hot potting of the two components.

The sealant coating is, in a preferred embodiment, free of VOC (volatile organic component) and solvent free. The sealant may be mixed 50/50 by volume. In some embodiments, the coating gels and is dry hard in about 30 minutes or under (or 100 minutes or under) and, upon cure, has peel strength between about 5 and about 35 pounds per inch width. The sealant coating, when fully cured, may have a hardness between about 20-80 Shore "A" at 77° F. or, in a preferred range of about 30-70 or in a most preferred embodiment about 40-60. The sealant coating may be applied to a thickness (cured) between about 3 to 30 mil. The coating may be applied in one or multiple layers, each layer formed by a separate pass of an applicator, such as a mix and spray gun.

In one embodiment, the sealant coating consists essentially of a clear, bubble-free, cured, two-component polyurea system. The first piece may comprise a clean dry, aluminum alloy. In another embodiment, the coating consists essentially of a clear, bubble-free, cured, two-component polyurethane system. In another embodiment, the coating consists essentially of a clear, cured, bubble-free hybrid polyurethane/polyurea system. Consists essentially means that there are no additional additives or parts that materially affect the sealant or clarity properties or dry time of the system. Any of these two component systems may be applied to only one surface of a piece of an aircraft part having two pieces.

A cartridge assembly for applying a sealant coating is disclosed, the cartridge assembly for use in a pneumatic mix and spray gun, the cartridge assembly comprising: a body having a first compartment and a second compartment, the first compartment containing a first part of a sealant mix, the second compartment containing a second part of the sealant mix, the body dimensioned to engage the mix and spray gun, the body also having a receiving port for receiving compressed gas to drive the mix; and a mixing straw engaged to the compartments, configured to receive and combine the two parts and emit a sealant mix, under pressure, from a tip at a removed end thereof to form a clear, cure in place, sealant coating on a workpiece, the clear sealant coating being one of a polyurea, polyurethane or hybrid coating. The sealant mix may have a dry through time of about 100 minutes or less or about 30 minutes or less.

An aircraft part is disclosed comprising: an aluminum or aluminum alloy first piece, the first piece having a first piece surface, wherein the first piece surface has a clear, elastomeric sealant coating, the sealant coating formed from a two component, room temperature, chemically cured, fast drying, sulfur free, polyurea/polyurethane/hybrid mix.

An aircraft part is disclosed for use on the interior of an aircraft, the aircraft part comprising: a first piece and a second piece, each piece having a piece surface, wherein at least one piece surface has a clear, elastomeric, VOC-free sealant coating, the sealant coating formed from a two component polyurea/polyurethane/hybrid mix, combined 50/50 by volume, with a hard dry time of less than about 30 minutes, the sealant coating with a peel strength between about 5 and 30 piw and a cured hardness of between about 20-80 Shore "A" at 77° F., and a thickness of between about 3 to 30 mil.

A two component cartridge is disclosed for engaging a pneumatic mix and coat spray gun for use with assembly and maintenance of aircraft, the two component cartridge comprising: a body comprising a first compartment having a first mix part, a second compartment having a second mix part, wherein the first and second mix parts combine in the mixing straw to form a polyurea/polyurethane/hybrid fast drying VOC and sulfur-free mix that cures to form a clear, elastomeric, sealant coating; and a mixing straw, engaging the two compartments and having multiple dividers for mixing the two components and emitting, under pressure, the mixed components from a tip thereof.

The cartridge assembly used for applying the mix and clear sealant coating has two compartments and a mixing straw to immediately mix and apply the two component mix. The sealant mix and the sealant coating formed from the drying or curing of the sealant mix may have a number of characteristics, including clarity; in some embodiments, optically clear and, in some embodiments, visually clear. The mix may be free of volatile organic components sulfur and silicon. The mix may be a two-part mix, in some embodiments, 50/50 by volume. The speed of drying and curing may be three hours or less to reach a hardness of about 20 to 80 Shore A at 77° F. The mix may have a dry through time of 100 minutes or less, or a dry through time of about 40 minutes or less. The sealant coating may be Jet A fuel resistant, flame retardant, and have a specific gravity of less than 1 (mean low density) or, in some embodiments, less than 0.97. The sealant mix displays good adhesion to an aluminum alloy workpiece, in the range of about 5 to 35 pounds per inch width and good cohesion. The viscosity of the sealant mix prior to gelling may be between about 150 and 1500 cps or less than 4000 cps as mixed and sprayed. In one embodiment, the sealing coat consists essentially of a two component polyurea system and, in another, a two component polyurethane system and, in another, a two component hybrid polyurea/polyurethane system.

The aluminum or aluminum alloy aircraft part may be coated with the clear, elastomeric sealant coating, the sealant coating formed from a two component, room temperature, cured, fast drying, silicon, VOC and sulfur-free polyurea/polyurethane/hybrid mix. It may be under compression by a second piece of an aircraft part and may be part of a floorboard assembly, an aircraft interior, or an aircraft fuel tank. The mix on the aircraft part or piece is applied with a pneumatic mix and spray gun, brush or roller. Preferably, a pneumatic mix and spray gun is used. There is no need to pot mix, shake and/or wait. The coating thickness may be about 3 to 30 mil and may be applied in one or multiple passes of a pneumatic mix and spray gun.

BRIEF DESCRIPTION OF THE DRAWINGS

FIGS. 6 and 7 illustrate the use of a pneumatic air gun with a mixing straw for applying Applicant's two-part system to a substrate, such as an aircraft piece.

DETAILED DESCRIPTION OF THE PREFERRED EMBODIMENT

Figure 1:
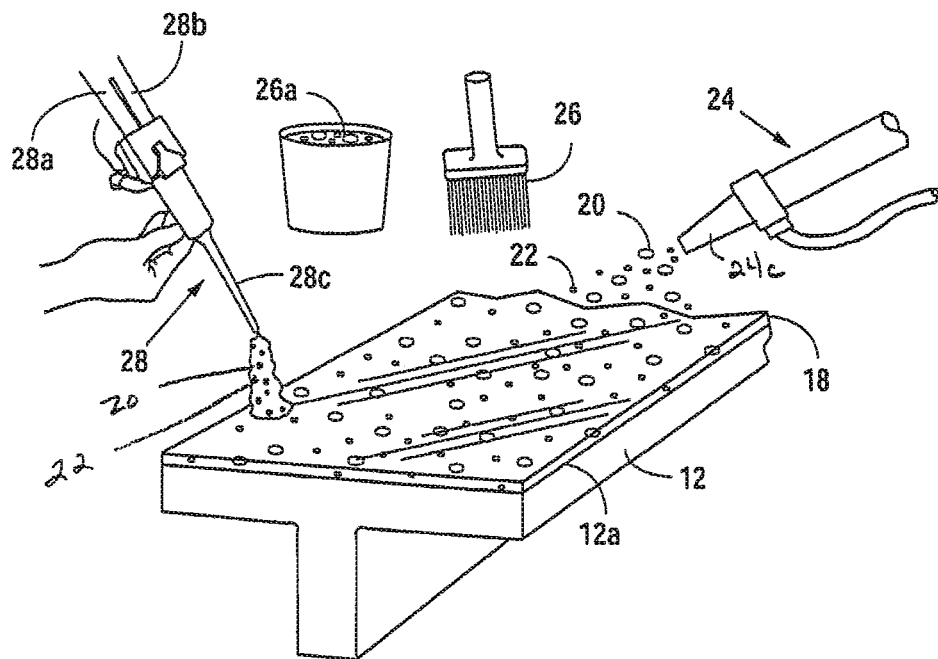
FIG. 1 illustrates in perspective view a coated aircraft piece and methods for applying the sealant coating thereto.

FIGS. 1, 2, 3, 4, 5, 5A, and 5B illustrate an aircraft part 10 comprising at least a first piece 12, which first piece 12 may have a first surface 12a, shown in FIG. 1, as a horizontal surface. One or more of the surfaces of first piece 12 may be at least partially coated with a moisture proof sealant coat or coating 18 comprising a two-component, room temperature chemically cured, clear, elastomer layer. The two components may be a first component 20, such as a resin blend, and a second component 22, such as an isocyanate (or hardener) component, the two components mixing and curing on a surface to form the sealant coating, which is typically cure in place (for example, on an aircraft part) and, in one embodiment, a polyurea coating, another embodiment a polyurethane coating, and a third embodiment a hybrid coating. The foregoing may be collectively referred to as polyurea/polyurethane/hybrid coating.

In the sealant coating, second component 22 can be an isocyanate which can be an aromatic or aliphatic in nature, a monomer, polymer or any variant reaction of isocyanates, quasi-prepolymer or a prepolymer. The prepolymer or quasi-prepolymer can be made of an amine-terminated polymer resin, or a hydroxyl terminated polymer resin (for a hybrid polyurea/polyurethane system).

First component 20 may be a resin component made up of an amine terminated polymer resin and/or amine terminated chain extenders. The amine terminated polymer resins will not have any intentional hydroxyl moieties. In a polyurea or polyurea/polyurethane hybrid system(s), the resin blend will typically not contain any catalysts.

Sealant coating 18 may be a polyurea/polyurethane/hybrid coating, but will be, in the preferred embodiment, relatively fast curing to an clear coating having one or more layers (see FIG. 7, layer 18a). The term "clear" means that the coating, at least when cured on a workpiece surface, allows an inspector to see, with the unaided eye, cracks, corrosion or defects in the workpiece surface. The terms "visually clear" and "optically clear" refer to the sealant coat passing the specific tests set forth below. Clear does not exclude some color or tint in the coating. Indeed, in some embodiments, it may be beneficial that the sealant coat may be tinted or undergo tint changes during cure.

Applicators 24/26/28 include preferably a pneumatic mix and spray gun 24 (having a body with two compartments 24a/24b for the two components 20/22, see FIG. 6), roller or brush 26, manual flow mix dispenser 28 (having two compartments 28a/28b for mixing in straw 28c (manual), see FIG. 1). Mix applicators 24/28 maintain the two components 20/22 in separate compartments, as in first compartment/second compartment 24a/24b of pneumatic mix spray gun 24 (typically airless or air assisted) as seen in FIGS. 6 and 7 or compartments 28a/28b. A mixing straw 24c/28c may be provided for mix applicators. Spray gun 24 may have compressed gas compartment 24d to receive compressed gas from source 25, with gas port 24e on a removed tip 29 of mixing straw 24c, A mixing straw 24c/28c may be provided for static mixers. Small batch mixing may be done in a container 26a when application is by brush or roller and gel time, such that the mix can be applied to a workpiece before it sets up (thickens) in the container.

Figure 2:
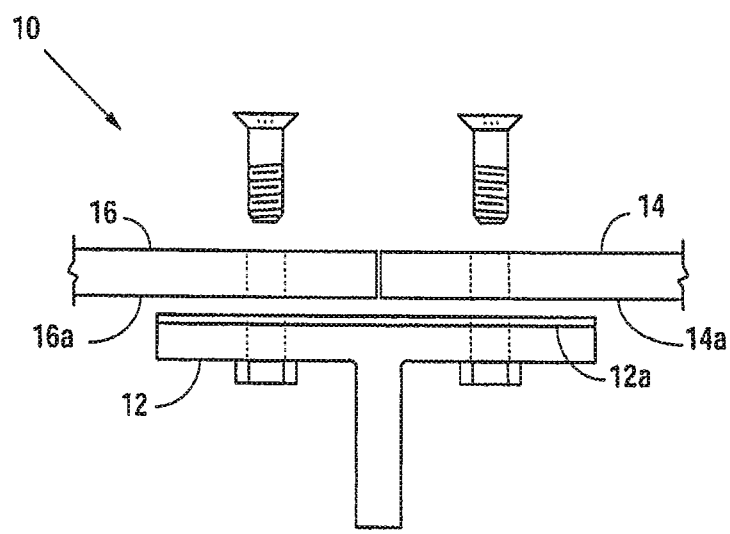
FIG. 2 illustrates an elevational view of an aircraft assembly comprising multiple pieces, at least some surfaces of some of the pieces being coated.
Figure 3:
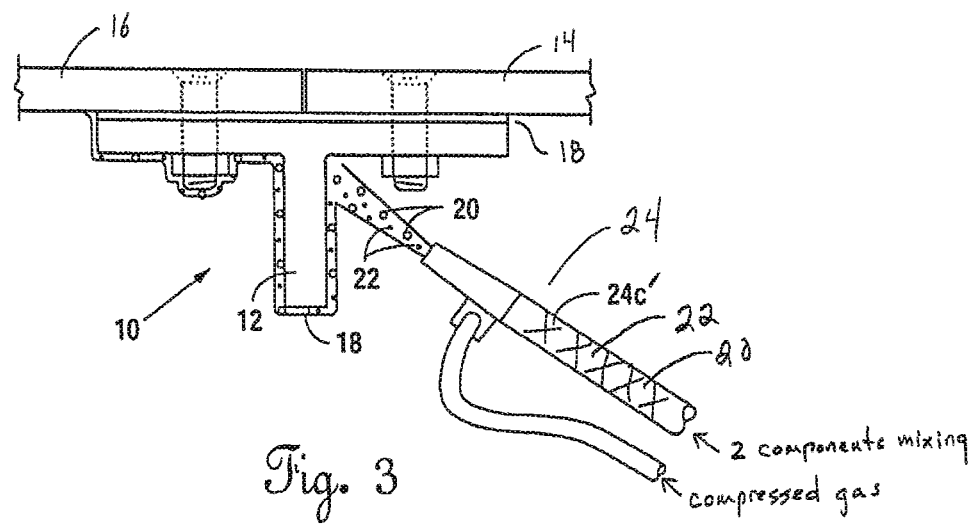
FIG. 3 illustrates a side view of the application of a sealant coating to an aircraft part, more specifically, a floorboard assembly comprising a floorboard support with floorboards attached thereto.

Turning back to coated aircraft parts 10, FIG. 1 illustrates first piece 12, in this particular embodiment, first piece 12 being a support member for an aircraft interior floorboard system comprising, typically, two or more floorboards 14/16 (see FIG. 2). FIG. 1 illustrates that a first surface 12a first piece 12 may be coated with sealant coat 18 prior to assembly. FIG. 3 illustrates that other surfaces of an aircraft part or piece may be coated, here after assembly, for example, after attaching of floorboards 14/16 and applying compression to the sealant coating, typically after it is dry hard (under about 100 minutes) or after it has substantially cured (to about 80-95% hardness), which may be about 0.5 hours to 4 hours. Sealant coat 18 may be under compression between a first and second piece 12/14, in one embodiment mating surfaces 12a and 16a (see FIG. 2). Compression may be applied between first piece 12 and second piece 14 (for example, floorboard support/floorboard), and a third piece 16 (another floorboard support/floorboard). The multiple pieces may comprise a multi-piece aircraft part, such as a floor assembly, with the elastomeric moisture-proof coating 18 serving as an effective sealant between parts under compression and/or as an outside coating on a piece or parts.

Turning to FIG. 3, an embodiment of an aircraft comprises part of first piece 12 that is not under compression, wherein the first piece is engaged with second and/or third pieces, the three pieces comprising an aircraft part 10 having at least a coating on at least a portion of a surface, including an outer surface, of at least one of the pieces. The sealant provides a moisture proof barrier to prevent or inhibit corrosion.

Figure 4:
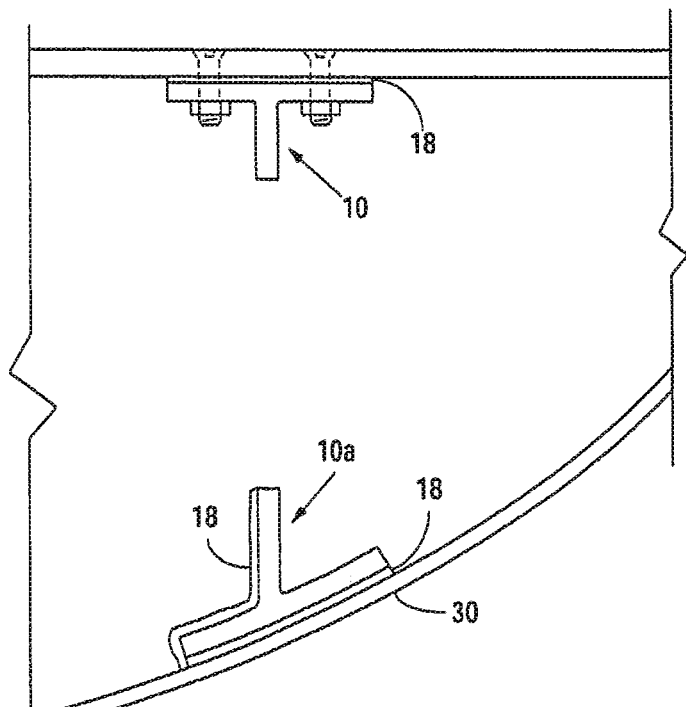
FIG. 4 illustrates in side view a portion of an aircraft interior comprising floorboards, frame stringers and skin, and the use of Applicant's coating therewith.

FIG. 4 illustrates an aircraft part comprising a frame stringer 10a and an aircraft skin 30, wherein coating 18 is provided on faying surfaces between skin 30 and stringer 10a as seen in FIG. 4, which cured sealant coating is under compression. It is also seen in FIG. 4 that sealant coating 18 may be covering at least a portion of the aircraft part (such as an outer surface) that is not under compression.

Figure 5:
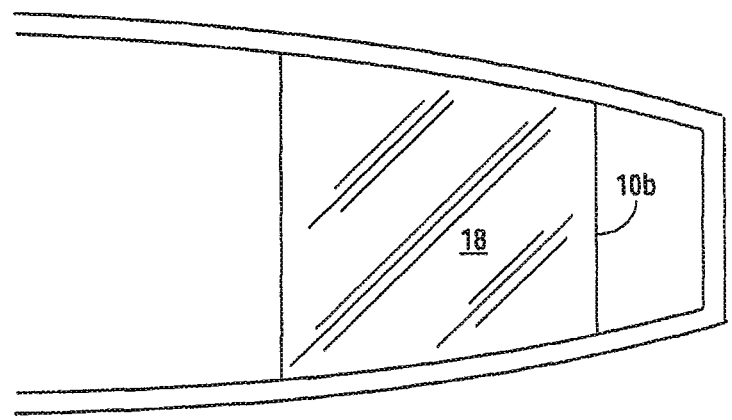
FIG. 5 illustrates a top view of an aft floor or cargo pan or aft galley pan of an aircraft, such as a Boeing 757, and the use of Applicant's sealant coating covering the floor and between support structure in the floor.
Figure 5A:
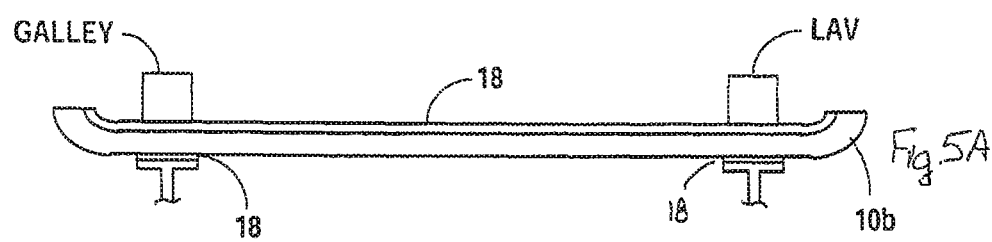
FIG. 5A illustrates FIG. 5 in cross-section and illustrates some of the places in which Applicant's sealant coating may be used with an aft galley pan.
Figure 5B:
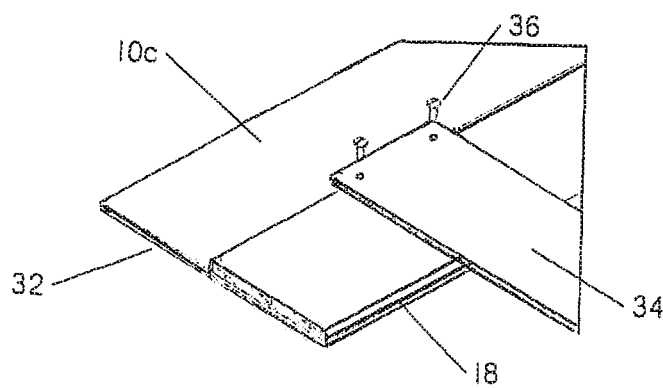
FIG. 5B illustrates a perspective view of aircraft fuselage panels forming a lap joint with Applicant's sealant coating between the mating surfaces.

FIGS. 5 and 5A illustrate the use of sealant coating 18 on the aft floor or cargo pan 10b on an aircraft, for example, a Boeing 767. Here, the surfaces coated may include one or more of: top surface of the pan, below the lay and galley, and between the pan underside and topside of a pan support member. FIG. 5B illustrates a lap joint 10c with Applicant's coating 18 between facing and mating surfaces, under compression, when fasteners, such as rivets 36, attach adjacent aircraft panels where they overlap, here, outer skin panel 32 and adjacent outer skin panel 34.

The sealant coating in a preferred embodiment is non-opaque or clear; in a most preferred embodiment optically clear or visually clear, so as to view any potential cracks, corrosion or fatigue that may occur on the coated parts. The coated parts, in one embodiment, may be an aluminum alloy, such as 2024, 6061 or 5056 or any other suitable alloy.

The compositions of the present invention may be applied to a variety of substrates, including, in addition to those set forth above: aluminum, aluminum alloy, carbon fiber reinforced plastics, and other composites. The sprayable composition of the present invention can be applied directly onto the surface of a substrate or over an under layer or previously applied coating.

Two preferred embodiments of a two component 20/22 (resin, hardener) mix capable of forming an optically or visually clear sealant coat 18 are available from KBS Chemical Company, Dodd City, Tex., Part No. SF2470 Sprayable Sealant or Part No. SF2387. These are two-component systems, a hybrid/polyurethane/polyurea system designed for use as a flexible, watertight sealant. They may be used on mating surfaces under compression or outer surfaces on one or more pieces of an aircraft part, typically an interior aircraft part. Its initial, pre-cured low viscosity allows it to be sprayed. In one embodiment, SF2470 is a two-component, VOC free, polyurea mix for use as a durable watertight sealant that is supplied in a two-part cartridge for use with a Sulzer or similar mix and spray gun as set forth herein. Because of its clarity, it provides easy visibility for inspection purposes long after the original application. The resin and hardener are both amber in the cartridge and mix under pressure in the static mix straw. They may be applied on horizontal or vertical surfaces. The resin may have a pre-mixed viscosity of between about 1,000 to 1,800 cps at 77° F. and the hardener (isocyanate) premixed may have a viscosity between about 250 to 550 cps. The mix may gel and dry to the touch in about 15 minutes or less (preferably in about 20 mins. or less, at 77° F.) at between 40° F.-100° F. and in about 3.0 hours or less it reaches a hardness of about 40-60 Shore A. Unexpectedly, even at lower temperature in this 40° F.-100° F. range, the dry time remains about 2.5 hours or less. The working life after mixing is about 4 minutes. In one embodiment, peel strength is between about 23 and 27 piw and the service temperature is about −85° to 185° F. Dry hard and dry through time is about 1.50 hours (or less) at 72° F. The coating is typically durable enough to walk (dry through) on without damaging in about one hour to an hour and a half or less. In this way, a product such as an aircraft piece or an aircraft part may be placed in service fairly quickly. Salt fog testing (ASTM) the KBS materials on aircraft interior surfaces (aluminum coupon) shows no visible corrosion present after 3000 hrs.

In one embodiment, Applicant's two-part polymer for use as a watertight, clear, spray on sealant is provided from AvDEC as Part No. SF2387 that is supplied in a two-part cartridge for use with a Sulzer or similar mix and spray gun as set forth herein, and is especially helpful for use as a sprayable fuel tank sealant (it is Jet A fuel resistant), but may be used anywhere in the aircraft interior. This product is 100% non-volatile with a mix viscosity of 7500 cps or less and a pot life of about 0.07 hrs. Resin viscosity is 1,000-1,800 cps and isocyanate is 250-550 cps. Dry through time is about 1.5 hrs. at 75° F. and dry hard time is about 3 hrs. at 75° F. It will gel in under 12 minutes and full cure in under 24 hours (77° F.). Adhesion (peel strength) is good at about 25 piw.

The preferred viscosity of the mix immediately upon mixing is between about 150 and about 1500 cps, and a preferred gel time (of 10 gram mass 77° F.) is between about 8 to about 14 mins. In one application, a coating thickness is provided between about 3 to 30 mil established in one pass of an applicator and is allowed to gel (about 8 to 14 mins.). In another application, a second layer 18a, also between about 3 and about 30 mil, may be applied, with a second pass of an applicator as seen, for example, in FIG. 7. An about 5 to 7 mil is typically the maximum thickness applied in a single pass without sagging on a clean, dry, vertical aluminum alloy surface (sprayed on with Sulzer Mixpac MixCoat Spray Gun, in one embodiment, modified with compressed gas port 24e on tip 29 of the mixing straw to break up the mix into small particles. Typically HVLP dispensers or air spray guns will not be used, rather airless or air assisted spray equipment may be used.

In a preferred embodiment, such as that found in the SF2470 coating, the reaction product mix ratio by volume is 50:50, with the resin viscosity (pre-mix) about 750 to about 1300 cps, the resin may be the first component 20 and the isocyanate (hardener viscosity pre-mix) about 180 to about 275 cps may be the second component 22. This coating passes flame retardant test without the addition of known flame retardant agents (12 second vertical burn per 14 CFR 25 Subpart D, § 25.853a, Appendix F, Part 1(A)(1)(ii). While SF 2470 has none of the following FR (flame retardant) powders, they may be added to any of the mixes disclosed herein to the extent they do not destroy clarity:

The flame retardant is not particularly limited but a halogen-free flame retardant which does not produce a toxic halogen gas, is preferable and, for example, known flame retardants free of halogen atom such as hydrated metal compound based flame retardants, inorganic compound based flame retardants, phosphorus flame retardant, silicone flame retardant, nitrogen compound based flame retardants, organic metal compound based flame retardants and the like can be used.

Examples of the hydrated metal compound based flame retardant include aluminum hydroxide, magnesium hydroxide, calcium hydroxide and the like. Examples of the inorganic compound based flame retardant include antimony compound, zinc borate, zinc stannate, molybdenum compound, zinc oxide, zinc sulfide, zeolite, titanium oxide, nano filler (montmorillonite (MMT), nano hydrated metal compound, silica), carbon nanotube, calcium carbonate and the like.

Examples of the phosphorus flame retardant include phosphates, aromatic condensed phosphates, ammonium polyphosphates and the like. Specific examples of the phosphate include triphenyl phosphate, tricresyl phosphate (TCP), cresyl diphenyl phosphate (CDP), 2-ethylhexyldiphenyl phosphate, triethyl phosphate (TEP), tri-n-butyl phosphate, trixylenyl phosphate, xylenyl diphenyl phosphate (XDP) and the like. Specific examples of the aromatic condensed phosphate include resorcinol bisdiphenyl phosphate, bisphenol A bis(diphenyl phosphate), resorcinol bisdixylenyl phosphate and the like. Specific examples of the ammonium polyphosphate include ammonium polyphosphate (APP), melamine-modified ammonium polyphosphate and coated ammonium polyphosphate.

Examples of the silicone flame retardant include dimethylsilicone, amino-modified silicone, epoxy-modified silicone and the like. Examples of the nitrogen compound based flame retardant include hindered amine compounds, melamine cyanurate, triazine compounds, guanidine compounds and the like. Examples of the organic metal compound based flame retardant include copper ethylenediaminetetraacetate, calcium perfluorobutanesulfonate and the like.

AvDEC Part No. SF5387 is supplied in a two-part cartridge for use with a Sulzer or similar mix and spray gun as set forth herein. It is another clear, two-part, sprayable fuel tank sealant comprised of a polyurea, polyurethane or hybrid that is fast drying and suitable for the aircraft interior; for aircraft interior parts, including a fuel tank sealant, further including a secondary vapor barrier. The non-volatile content is about 75%, with a 25% volatile component that is exempt per 40 CFR Chapter 1, Subchapter C, Part 51, Subpart F/Section 51.100. The mix viscosity is about 550 cps, and the pot life is about 10 to 12 mins. It will dry hard at 75° in about 30 mins. or less and dry through at 75° in about 30 mins. or less. Adhesion is good at about 25 piw.

While SF2470 can be used on horizontal or vertical surfaces, the SF2387 and SF5387 may be easier to use on vertical surfaces, and both of the latter have resistance to degradation by Jet-A fuel. Fuel resistance means that the cured sealant has at least 5 piw (preferably at least 15, most preferably at least 25) after 168 hours of exposure to JetA fuel at 70° F.

All three products are clear, two-part sprayables that are quick drying, having fast dry hard and fast dry through time compared to the prior art. Both dry hard (thumbprint)/dry through (thumbprint and turn) times are performed in accordance with FED-STD-141. These advantages provide for faster assembly time for an aircraft, especially where larger areas of the aircraft are covered. Moreover, all of these sealants may be applied to aluminum or aluminum alloy substrate, and have a sufficient temperature service range and clarity along with sufficient tensile strength for use on aircraft undergoing repeated thermal cycling.

The product gels quickly upon mixing, such that it can be used even on vertical surfaces, as set forth herein, without "running." Applicant's two-parts are, in some embodiments, both sulfur-free and free of a catalyst and, in a preferred embodiment, solvent-free. The composition of the present invention is particularly suitable for airless or air assisted (not HVLP) spraying, even when substantially or completely free of VOCs. In some embodiments, the specific gravity of the mix is between 1.0 or 0.97 or less, where most prior art sealants are greater than 1.0.

Dry hard is dry, such that the sealant has already gelled and will not leave a thumbprint pressed at about 6 lbs. Thus the coated surface can be handled and, therefore, speeds up time on the assembly line. Dry through means the thumb is rotated 90° while pressing and the material shows no loosening, detachment wrinkling or other distortion of the film occurs (see FED-STD-141 method 4061.3 for both).

The present composition may include colorants to the extent they could not impair clarity. Such colorants may include pigments, dyes or tints, such as those used in the paint industry or listed in the Dry Color Manufacturers Association. The colorant could be in the form of a dispersion, including, but not limited to, an amount of particle dispersion.

A hardness after 2-6 hours (about 80-95% cure) of between about 30 and about 70 Shore "A" has been found to be suitable for most aircraft applications (or a final hardness of about 40 to 80 after 78 hours or more). Likewise, a peel strength of between about 5 and about 30 lbs. per inch width on a clean, dry 6061 aluminum alodine coated substrate at about ⅛" thickness (90° peel back) has provided satisfactory adhesion under the use as indicated. In a preferred embodiment, sealant coating 18 is elastomeric and may have a tensile strength of between about 100 and 200 psi or, in one embodiment, about 140 psi, and elongation of about 200% or in the range of about 100-400%.

As used herein, the term "optically clear" refers to a sealant coating that has a luminous transmittance of at least 85% and a haze no greater than 5% as measured using the method shown in ASTM D1003-07. With this method, measurements are made in the 400 to 700 nanometer wavelength range. In some embodiments, the luminous transmittance is equal to at least about 88%, at least 90%, at least 91%, at least 92%, or at least 93%. The haze is no greater than 4, no greater than 3, no greater than 2, or no greater than 1%. Some exemplary sealant coatings have a haze no greater than 3% and a luminous transmittance equal to at least 85% as measured using method ASTM D1003-07. Other exemplary coatings have a haze no greater than 2% and a luminous transmittance equal to at least 85% as measured using method ASTM D1003-07. Not all materials that are visibly clear are considered to be optically clear. That is, visible clarity is not always synonymous with optical clarity. A material that is visibly clear or clear may have a haze value greater than 5, a luminous transmittance value less than about 85%, or both. In one embodiment, the coating is optically clear (meaning has optical clarity).

Figure 9:
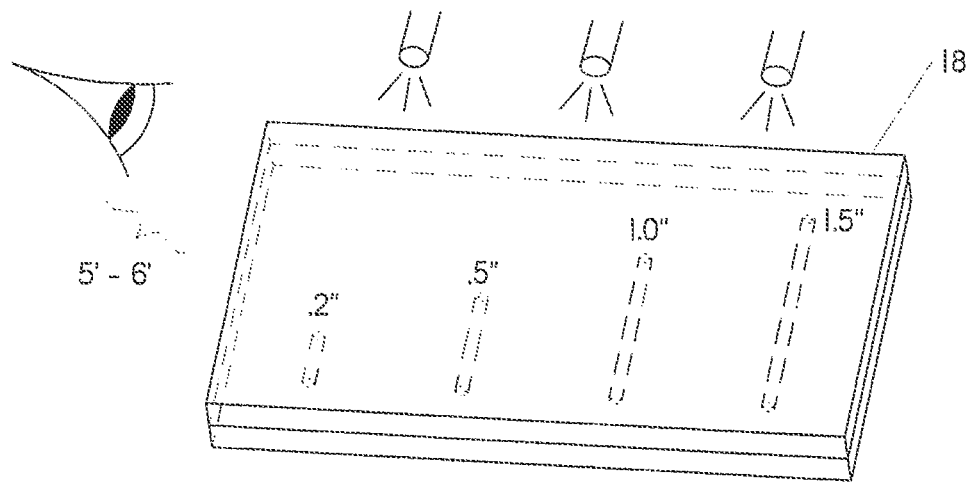
FIG. 9 illustrates a test for visual clarity of a sealant coat.

Another test (see FIG. 9) for clarity involves placing four 50 AWG tungsten wires (lengths=0.2 inch, 0.5 inch, 1 inch, 1.5 inch) on a test panel and coating the panel with the sealant about 0.040" thick. After cure, one may visually examine (assuming 20/20 vision) to determine the minimum length of wire that is visible from about 5-6 feet away under normal lab light conditions (100 to 1000 lumens). The shortest wire should be visible. Applicant's coating as set forth should pass at least this test, and passing this test refers to visible clarity or visually clear. In some embodiments, Applicant's mix should pass this test immediately upon application and through to full cure.

Moreover, the sealant from application through full cure, in one embodiment, is always visibly clear and/or optically clear though it may be tinted. As such, user may visually inspect the sealant and the underlying workpiece for air bubbles, debris, corrosion, cracks in the workpiece, etc.— even when it is immediately applied, and minutes, hours, days, weeks or months later.

Pieces placed under compression may be placed together following full cure, or between gel and full cure, or between immediate application and gel time, the latter two conditions may generate better adhesion to the uncoated piece.

Figure 8:
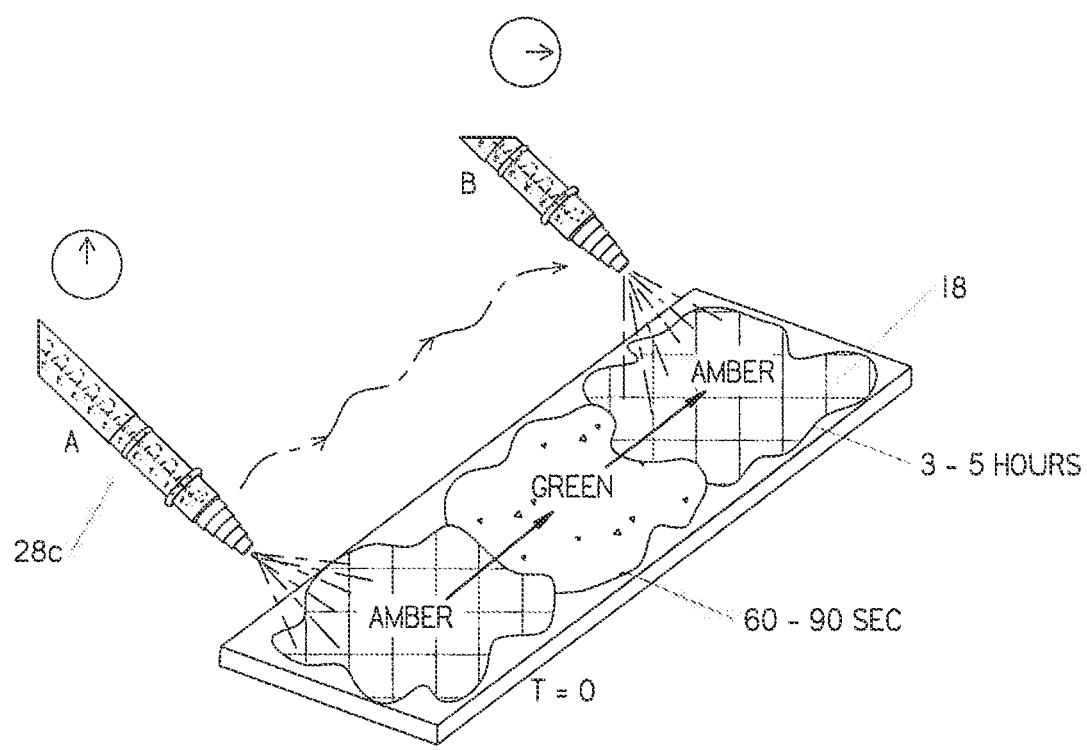
FIG. 8 illustrates a preferred embodiment of a sprayable sealant undergoing a color change after application.

FIG. 8 shows a color or tint change between the time of application and sometime after the time of application of the coating on a substrate. This color or tint change may be useful to the user in that one can visibly see where on a workpiece the material has been applied and where it hasn't and may take certain steps responsive thereto. One may also judge the time that the coating has been on, qualitatively speaking, by the color change. The user may take certain steps, like respray (a second or subsequent coat), or affix a second surface to the workpiece responsive to the color change. In addition, the color change indicates where on the workpiece the coating has been applied. In one embodiment, as seen in FIG. 8, the sprayable sealant (here SF 2470) mixes and goes on amber, but almost immediately, within about 60-90 seconds, goes to a dark greenish or blue tint (buy typically clear) and, after about 90 seconds, begins to slowly go back to clear amber with the full color change in 3-5 hours.

Figure 10:
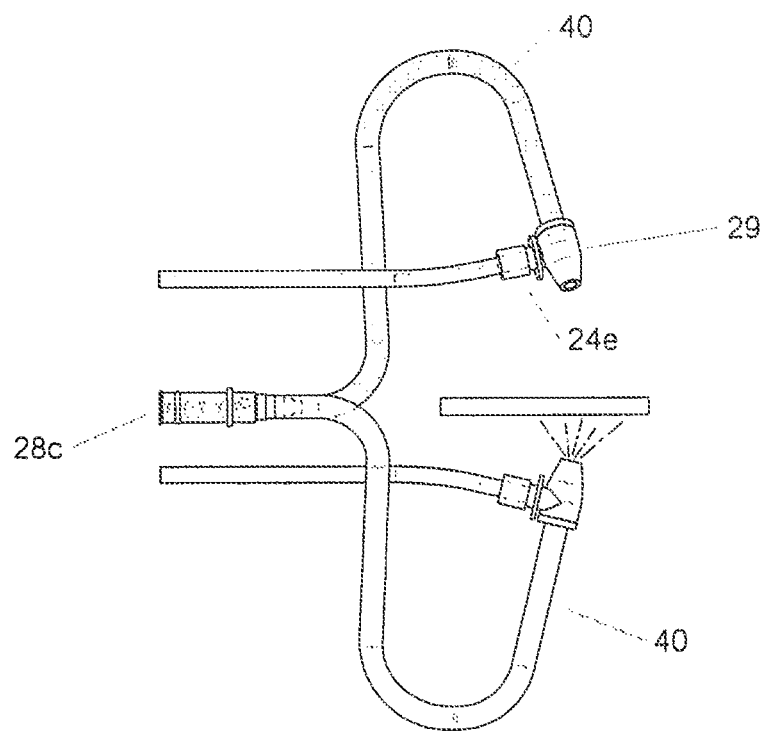
FIG. 10 illustrates a novel, flexible tip extension member for use with a pneumatic spray gun.
Figure 12A:
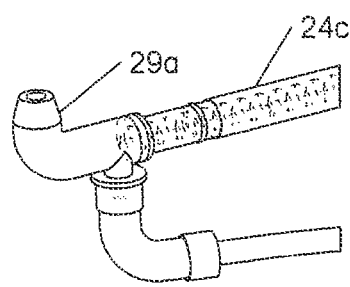
FIGS. 12 and 12A illustrate spray gun modifications that may be useful with applicant's spray sealant.

FIG. 10 shows modification to a spray gun made adding a flexible section 40 beyond the end of the mixing straw and before the application of the compressed air at compressed air inlet port 24e. This flexible section is flexible, but with sufficient rigidity that when set, allows one to control the direction of the emission of the spray from the tip (compare clear and speckled positions in FIG. 10). FIG. 12A illustrates a fixed 90° tip 29a, which in one embodiment may be a 90° and, in another embodiment, any angular deviation from a longitudinal axis of the gun and spray between about 10°-80°. Both FIGS. 10 and 12A embodiments make it easier to shoot around and underneath certain parts, for example, the deck plate and an aft galley.

One of the uses of the clear sealant coating includes a secondary fuel vapor barrier (see FIG. 5E), such as around the outside of a front spar and wing center section fuel tank 51 (and associated spars, stringers, stiffeners, brackets and panels) on a Boeing 737 series aircraft. The secondary fuel vapor barrier may be used on aircraft internal fuel tanks. As such, the sealants may be applied to the exterior surfaces of a center wing box fuel tank. If a leak occurs in the fuel tank's primary seal system, the sealant may aid in containing the leak and preventing fuel spread. The sealants also help prevent fuel or fuel vapors from leaking into the cargo or passenger compartments and/or coming into contact with a possible ignition source. Moreover, their clarity provides for ease of inspecting the surface beneath the sealant for cracks, corrosion or the like.

Figure 11:
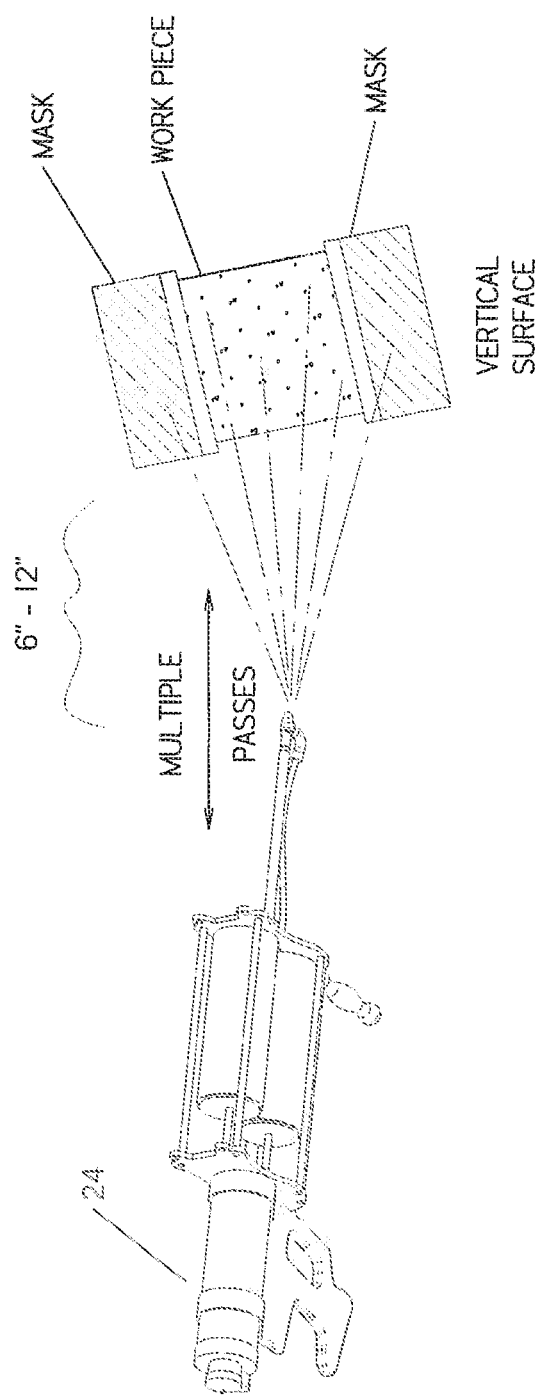
FIG. 11 illustrates details of spraying a vertical surface with a spray sealant applied with a pneumatic spray gun.
Figure 13:
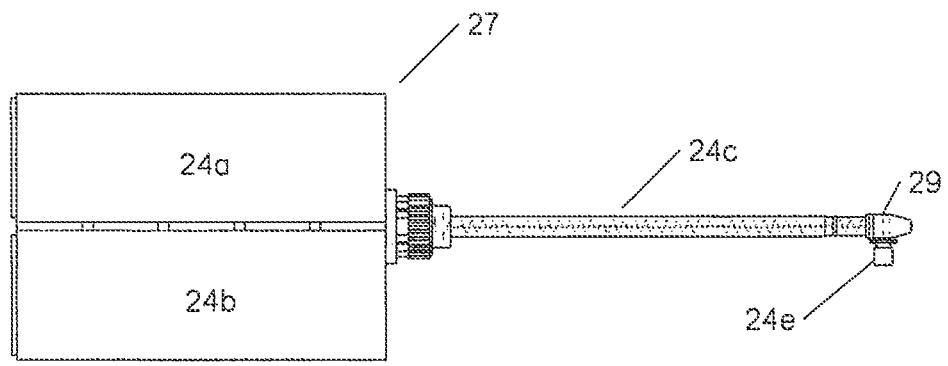
FIG. 13 illustrates a cartridge 27 for use with pneumatic spray gun.

FIG. 11 illustrates a manner dealing with potential overspray and misting issues when spray gun 24 is run at high pressures, such as spray settings between 5 to 10 (fluid flow) and 3-5 for air pressure on the Sulzer gun referenced herein, which may be a pneumatic Mixpac, MixCoat™. Increase fluid flow slightly for thicker coat on horizontal workpiece (increase splatter). Increasing air slightly will produce a thinner, misty effect and avoid sag on a vertical surface—but may require multiple passes to obtain the desire thickness needed for coating vertical surfaces. These air pressures for vertical surfaces are slightly higher than those typically needed for horizontal surface, where the pressure may be turned down to about 20 to 80. In a horizontal surface, the preferred embodiment of the uncured mix tends to be self-leveling and will generally level to the horizontal before a gel sets up.

Figure 12:
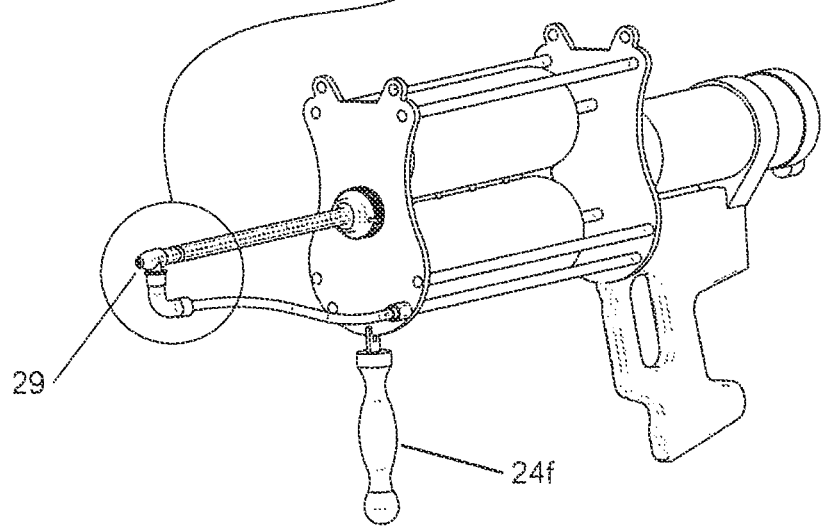

Applicant's mixing straw 24c, in one embodiment, is constructed as set forth in U.S. Pat. No. 7,144,170, incorporated herein by reference. The mixing straw may, in one embodiment, progressively divide and recombine through the use of multiple baffles 24c' (see FIG. 3) to thoroughly mix the reactive ingredients of the sealing coating. The reactive components traverse the length of the mixing straw and the number of mixing elements experienced by the fluid may be in the range of about 12 to 42. One mixing straw is available from Brandy Wine Mixers as Part No. MFH 08-32T and has specification chosen by Applicant to provide for the sufficient mixing at the desired viscosity ranges set forth herein. Mixing straws are also disclosed in U.S. Pat. Nos. 4,850,705; 4,767,026; and 4,538,920, incorporated herein by reference. The static mixing straws may be stepped down mixing straws and may be connected to cartridge 27 with any suitable connection, such as threads, Leur-lock, lock-on retainer nut, snap fit, frictional fit, and the like. Tip 29 may be straight, see FIG. 12, or bent to any angle, such as 90°, see tip 29, FIG. 12A.

In one embodiment, the mixing straw has a spray nozzle attached to the end with an about 0.095 in. aperture. One static mixing straw that applicant has chosen specifically for the application set forth herein is Sulzer MixPack Static Mixer MFH 08-32T. The static mixer may apply the sealant in a 1:1 ratio and as 32 mixing elements, and the mixing straw may be removable and replaceable (disposable mixing straw).

Dispensing gun 24 is not particularly limited so long as it is capable of keeping the two part isolated until application and applying sufficient force to the two-part cartridge to move and mix the reactive components through the static mixing straw and expel the mix from the tip. Dispensing gun 24 may be manual, pneumatic or hydraulic and, in one type, is pneumatic.

The sealants disclosed herein are preferably supplied in a two-part cartridge ready for application immediately upon mixing, without any serious defects in the coating. Some prior art multi-part mixes require a period of time when they have to sit in the pot before suitable for applying to a substrate and if one waits too long, the mix becomes viscous and difficult to shoot or otherwise apply. Moreover, sealants herein have an overcoat window that allows large areas to be covered without the need for sanding before applying an overcoat. In a preferred embodiment, the overcoat window is as soon as 8 to 15 minutes from initial coat. In a preferred embodiment, the composition mixes clear, goes on clear, and stays clear through cure. Clarity, especially at full cure and over long periods of time (one year or more) is important for checking for stress cracks and corrosion. Moreover, if cracks or corrosion is found, applicant's sealant can be removed (by razor or abrasion, for example). The site may be repaired and the repaired area recoated with overlap, if necessary, onto the original coating. Good cohesion (with maintenance of peel strength) of the new just mixed to fully cured sealant insures that the overlap is strong and clean.

Spray settings on the Sulzer are about 5 to 10 for fluid flow and about 3 to 5 for air pressure. Increasing the fluid level slightly (to 5.5 for instance) will produce more of a splatter effect that works well for applying a thicker coating on horizontal surfaces. Increasing the air slightly will produce a thinner misty effect that allows you to apply an even coat on a vertical surface with no sag. The thinner the coat the better the clarity and the less sag in the material. Some parts may need several thin coats and others a fewer thick coats even if it may be a little less clear and sags a bit. Spray approximately 6 inches to 1 foot away from the work surface on most applications.

Figure 5C:
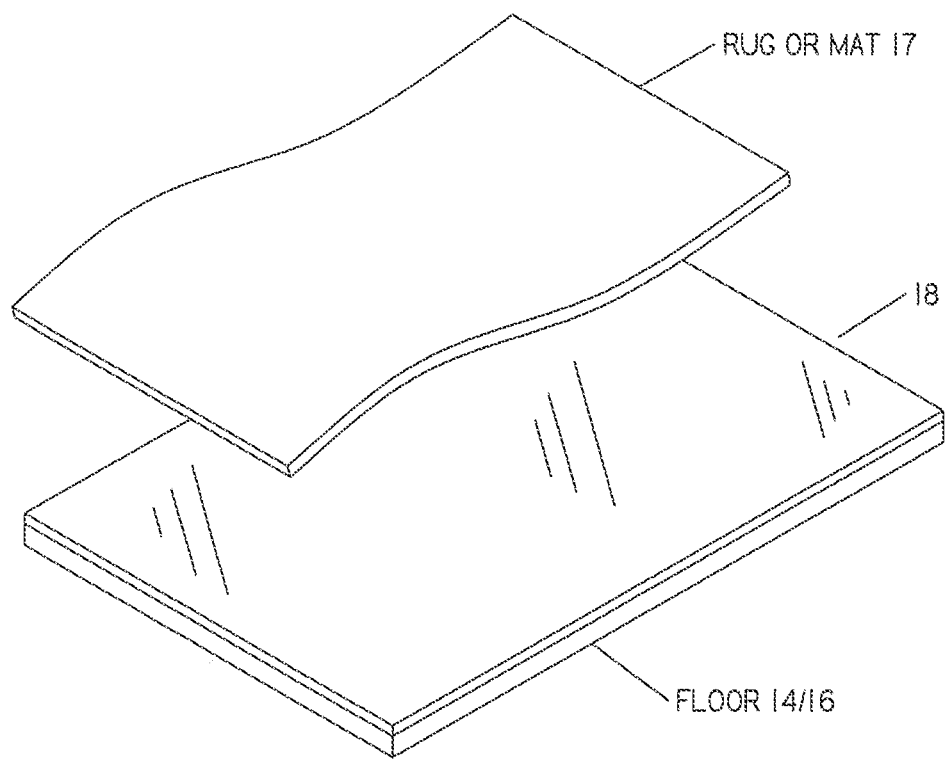
FIG. 5C shows Applicant's sealant between a top surface of a floor and a floor covering.
Figure 5D:
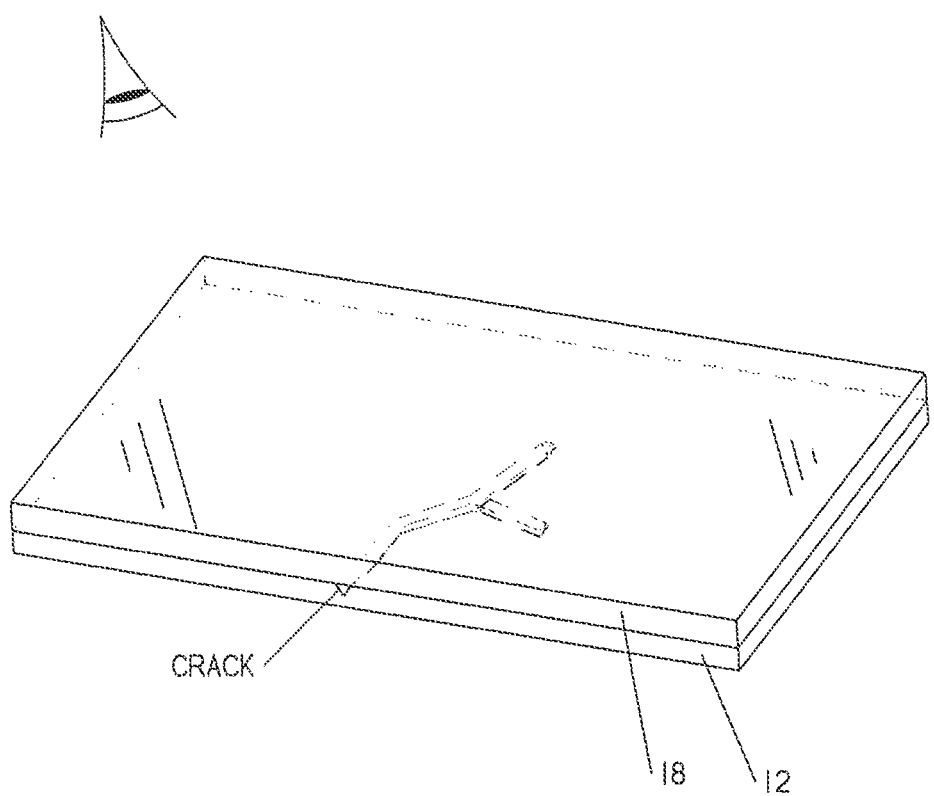
FIG. 5D illustrates the clarity of Applicant's coating and the ability to see cracks or corrosion therethrough.
Figure 5E:
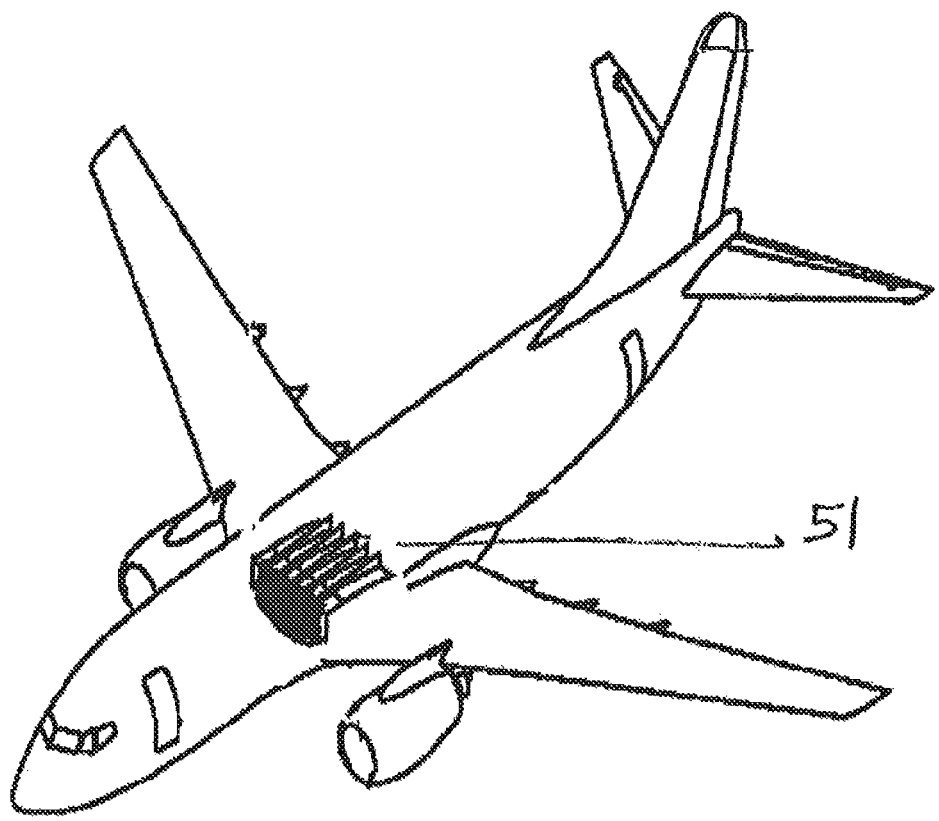
FIG. 5E illustrates another location that is suitable for application of Applicant's sealant coat.

FIG. 5C shows Applicant's sealant 18 used over an aluminum floorboard 14/16 in an aft galley or other location of an aircraft. A rubber cover or other floor covering 17 or other flexible member is applied on top of Applicant's sealant coat and the floor covering is used as the surface that people actually walk on. The use of Applicant's sealant 18 between the floorboard and the floor covering, such as a rubber cover or rug, provides both an environmental sealant and a durable somewhat resilient base for ease of walking or standing.

Although the invention has been described with reference to specific embodiments, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A method for coating an aircraft part with a sealant, comprising the steps of: providing a pneumatic, mix and spray gun with a mixing straw and two chambers,
   a first chamber having a first mix component with a viscosity of 1000 to 1800 cps and a separate second chamber having a second mix component with a viscosity of 250 to 500 cps, the mix and spray gun configured to mix and emit a spray of atomized, uncured mix from the tip of a mixing nozzle;
   first directly applying to a first section of a first workpiece at ambient temperature a first layer of uncured mix; allowing the uncured mix to cure at ambient temperature to form a clear sealant coating, the sealant coating being one of a polyurea, a polyurethane or hybrid coating; and wherein the allowing step takes about 100 minutes or less at 77° F. for the mix to reach dry hard.

2. The method of claim 1, wherein the allowing step takes about 30 minutes or less at 77° F.

3. The method of claim 1, wherein the first applying step is airless or air assisted.

4. The method of claim 1, further including a second applying to the first layer a second layer of uncured mix.

5. The method of claim 4, wherein the first layer is 10 mil or less in thickness.

6. The method of claim 1, wherein the mix, prior to gelling, is 4000 cps or less.

7. The method of claim 4, wherein the mix prior to gelling is 4000 cps or less.

8. The method of claim 4, wherein the first layer is 10 mil or less in thickness, and wherein the mix prior to gelling is 4000 cps or less.

* * * * *